United States Patent [19]

Roeder et al.

[11] Patent Number: 5,229,097
[45] Date of Patent: Jul. 20, 1993

[54] PROCESS FOR THE PRODUCTION OF CHLOROSILICATES

[75] Inventors: Alfred Roeder, Duisberg; Rüdiger Oberste-Padtberg, Wuppertal; Dietrich Gruschka, Wülfrath; Dieter Opitz, Ratingen, all of Fed. Rep. of Germany

[73] Assignee: Rheinische Kalksteinwerke GmbH, Wülfrath, Fed. Rep. of Germany

[21] Appl. No.: 749,432

[22] Filed: Aug. 23, 1991

[30] Foreign Application Priority Data

Aug. 31, 1990 [DE] Fed. Rep. of Germany ....... 4027529

[51] Int. Cl.$^5$ ............................................. C04B 67/26
[52] U.S. Cl. .................................. 423/341; 423/240 S; 423/326
[58] Field of Search .............. 423/326, 341, 240 S, 423/241; 106/481; 252/187.31

[56] References Cited

U.S. PATENT DOCUMENTS

| | | | |
|---|---|---|---|
| 4,116,705 | 9/1978 | Chappell | 106/90 |
| 4,226,630 | 10/1980 | Styron | 106/85 |
| 4,726,940 | 2/1988 | Kobayashi | 423/240 |
| 4,753,785 | 6/1988 | Kisters | 423/240 |
| 4,784,837 | 11/1988 | Kitayama et al. | 423/210 |
| 4,789,532 | 12/1988 | Jöns et al. | 423/240 |
| 4,937,065 | 6/1990 | Maurer et al. | 423/659 |

*Primary Examiner*—Olik Chaudhuri
*Assistant Examiner*—Ken Horton
*Attorney, Agent, or Firm*—Nils H. Ljungman & Associates

[57] ABSTRACT

This invention relates to a process for the production of a usable or storable product with a low susceptibility to elutriation by water. This product is produced from residues containing halides obtained from a waste gas cleaning process. The halide containing residues as components of a crude dust having a $CaO/SiO_2$ ratio between 1.7 and 3.4, are subjected to a thermal treatment to produce chlorosilicates. The waste gases formed during the thermal treatment for chlorosilicate production are subjected to a preliminary cleaning, and are then transported to the waste gas cleaning system of a refuse incineration plant. The residues occurring during the preliminary cleaning can be added to the crude dust.

14 Claims, 4 Drawing Sheets

PROCESS FOR THE PRODUCTION OF CHLOROSILICATES

BACKGROUND OF THE INVENTION

1. Field of the Invention

This invention relates to an environmentally safe process for the production of a usable or storable product with a low susceptibility to elutriation by water. This product is produced from residues containing halides obtained from a waste gas cleaning process. The halide containing residues, as components of a crude dust having a $CaO/SiO_2$ ratio between about 1.7 and about 3.4, are subjected to a thermal treatment for the production of chlorosilicates, and the gas produced during the thermal treatment process is subjected to at least one cleaning stage.

2. Background of the Invention

Residues from waste gas cleaning apparatus of waste incineration plants can contain high amounts of halogens, especially if the treatment process is a dry or semi-dry process. In this respect, the amount of chloride can be 20% or more and the gas can also contain some fluorides.

In general, the gas cleaning stage involves a sorption method on $Ca(OH)_2$ in which HCl, $SO_2$, $SO_3$, and HF, if present in the exhaust gases, can react so that the residue from the gas cleaning can contain basic chlorides - $CaCl_2 \cdot Ca(OH)_2 \cdot nH_2O$, calcium chlorides - $CaCl_2 \cdot nH_2O$, anhydrous $CaSO_4$, half hydrated $CaSO_4 \cdot \frac{1}{2} H_2O$, gypsum - $CaSO_4 \cdot 2H_2O$, and fluorite - $CaF_2$.

In addition, the adsorption material, $Ca(OH)_2$ can become carbonated at least partially to form $CaCO_3$ because of the high $CO_2$ content of the waste gases, and it will also generally become contaminated from ash particles in the waste gas. Thus, the residues, which residues contain the adsorption material, may also contain various amounts of calcium alumino silicates, alkali alumino silicates, iron oxides, iron hydroxides, and volatile heavy metals such as lead, zinc and copper.

Such residues are generally not usable as aggregates in concrete or street construction because of their heavy metal content and high chloride content, especially since most chloride compounds are readily susceptible to elutriation by water.

As disclosed by Federal Republic of Germany Patent DE 39 06 617, the components which can be leached out of the finished product are incorporated in a mineral matrix so that, compared to untreated residues containing halides from waste gas cleaning, a clearly lower susceptibility to elutriation by water is achieved. The residues are thereby converted into a product which can be used as a hydraulic binder or cement.

Such treatment is achieved by thermally treating the halogen containing residues as components of a crude dust or raw meal having a $CaO/SiO_2$ ratio within a range of about 1.7 to 3.4 to thereby form chlorosilicates which have a low susceptibility for elutriation by water.

However, it has been determined that during the thermal treatment for the production of chlorosilicates, according to the process disclosed by DE 39 06 617 C1, the waste gases that are produced from the process also contain certain quantities of halides. The halides in this waste gas come from evaporation during the combustion process, and can account for up to about 10% of the total halide content of the pellets. This quantity of volatile halides therefore casts doubt on the utility of the process disclosed in DE 39 06 617 C1, to the extent that, on account of the air pollution laws, such large quantities of halides cannot simply be discharged into the atmosphere. An additional waste gas cleaning step for cleaning the waste gas is therefore necessary to meet pollution law standards when the process for making the chlorosilicates as disclosed by DE 39 06 617 C1, is being used.

OBJECT OF THE INVENTION

The object of the invention is therefore to create preventive measures for making the halide containing gases given off during the process for producing chlorosilicates from residues from waste gas cleaning, safe, so that the gases can be discharged into the atmosphere in compliance with laws and regulations.

SUMMARY OF THE INVENTION

This object is achieved by the process of the present invention, by taking the waste gases formed during the thermal treatment in chlorosilicate production, according to the process as disclosed in DE 39 06 617 C1, and preferably subjecting the waste gases to a preliminary cleaning step rather than emitting the gases directly into the atmosphere as was previously done. After the preliminary cleaning step, the waste gases can then preferably be transported to a waste gas cleaning system of a refuse incineration furnace for further cleaning. The residues formed during the preliminary cleaning ca be collected and recycled back into the crude dust for use in making additional chlorosilicates.

In the process according to the invention, pollutants contained in the waste gases, in particular, halides which are formed during the thermal treatment in chlorosilicate production according to the principal patent, are separated by suitable processes in the course of the preliminary cleaning. The residues are preferably separated as solids, which solids can then be recycled by adding them back into the raw meal. The waste gases from which the pollutants have been removed by preliminary cleaning are then preferably conducted to additional waste gas cleaning apparatus for additional cleaning. This additional waste gas cleaning can preferably be done in a waste gas cleaning system of a refuse incineration furnace. The small quantities of waste gas from the preliminary cleaning, in addition to a quantity of waste gas from the refuse incineration, are then preferably cleaned of their pollutants in the waste gas cleaning system of the incineration furnace so that the resultant exhaust gas will meet any government requirements.

The preliminary cleaning of the waste gases can be done by a dry sorption process using calcium hydroxide as the basic reagent. Such a dry sorption cleaning process is very economical.

In accordance with an additional preferred configuration of the process which is the object of the invention, the residues from the waste or exhaust gases from the chlorosilicate production, before the entry of the waste or exhaust gases into the waste gas cleaning system of the refuse incineration furnace, can also preferably be separated by filters in the preliminary cleaning stage. Such a filter separation may be usable alone, or in combination with the adsorption step if both are necessary or desired. The filters which can be used preferably include electrofilters and/or mechanical filters, and the mechanical filters can include such filters as cloth bag filters, cloth tube filters and ceramic filters. Some or all of the separated and collected residue can be added back into the crude dust.

It is also preferred that the waste gases, before their entry into the preliminary cleaning stage, be subjected to a gas conditioning stage to reduce their temperature. The temperature reduction in the gas conditioning stage can preferably be achieved by spraying the gas with water. This is one of the simplest and most economical methods of reducing the temperature of the waste gases to be cleaned. However, other cooling methods such as cooling by addition of cooler air into the exhaust can also be used.

In summary, one aspect of the invention resides broadly in a process for the production of a chlorosilicate product from halogen containing residue obtained from a waste gas cleaning apparatus. The process comprises the steps of: obtaining the halogen containing residue from the waste gas cleaning apparatus; obtaining a divided material comprising at least CaO and $SiO_2$, the CaO and $SiO_2$ for forming the chlorosilicate product; mixing the halogen containing residue and the divided material to form a first mixture; thermally treating the first mixture to form at least chlorosilicate product and exhaust gas, the exhaust gas containing a second residue; and separating at least a substantial portion of the second residue from the exhaust gas to produce at least partially purified exhaust gas.

Another aspect of the invention resides broadly in a process for cleaning an exhaust gas produced during production of chlorosilicates from a halogen containing residue from a waste gas cleaning system of an incinerator, the exhaust gas comprising a residue. The process comprises the steps of: conducting the exhaust gas from the chlorosilicate production to an exhaust gas cleaning apparatus; and separating at least a substantial portion of the residue from the exhaust gas to produce at least partially purified exhaust gas.

BRIEF DESCRIPTION OF THE DRAWINGS

The process according to the invention is explained in greater detail below, with reference to the accompanying drawings, in which.

DESCRIPTION OF THE PREFERRED EMBODIMENTS

Figure 1:
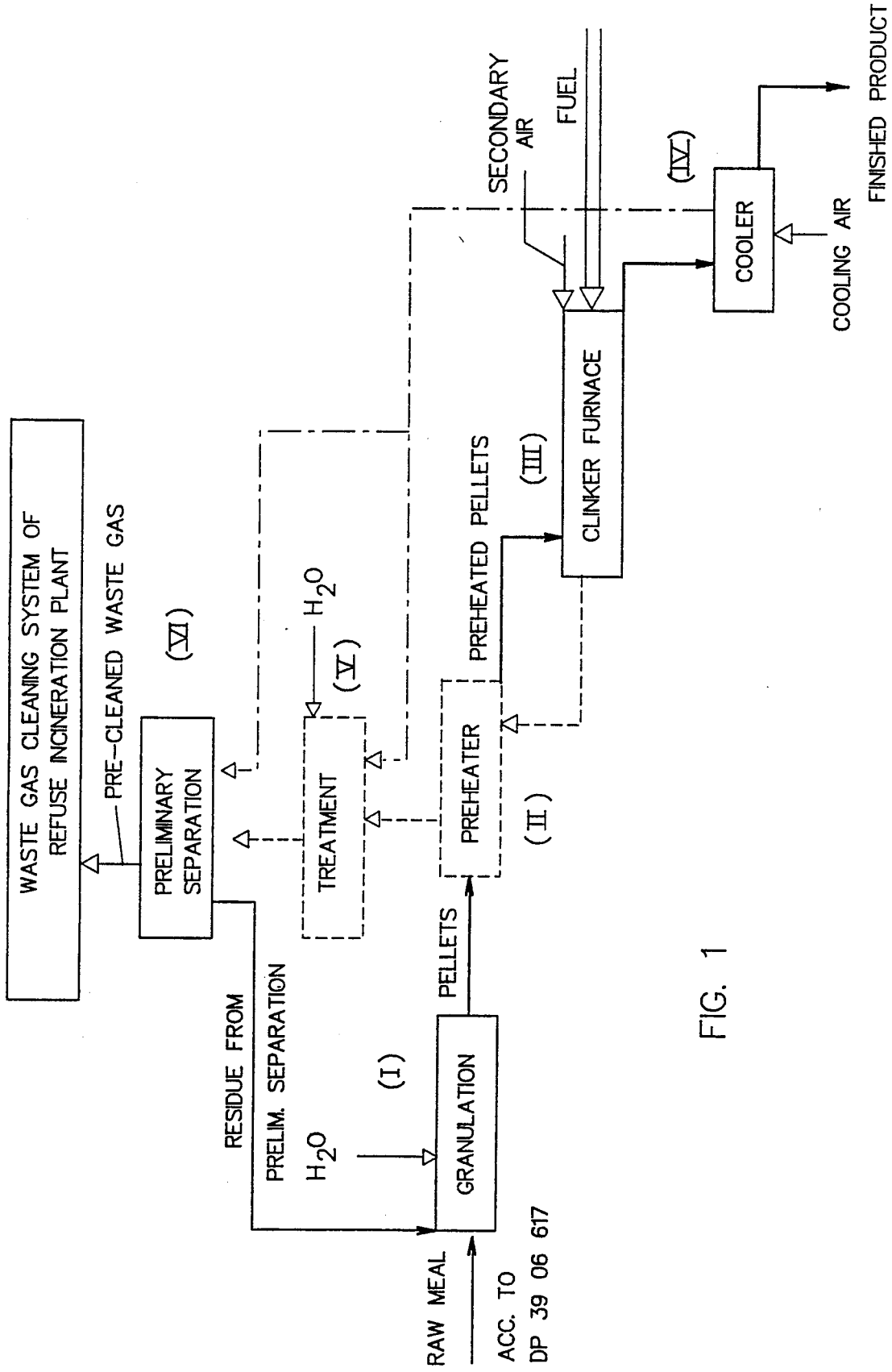
FIG. 1 is a schematic drawing showing the process steps of the present invention.
Figure 1A:
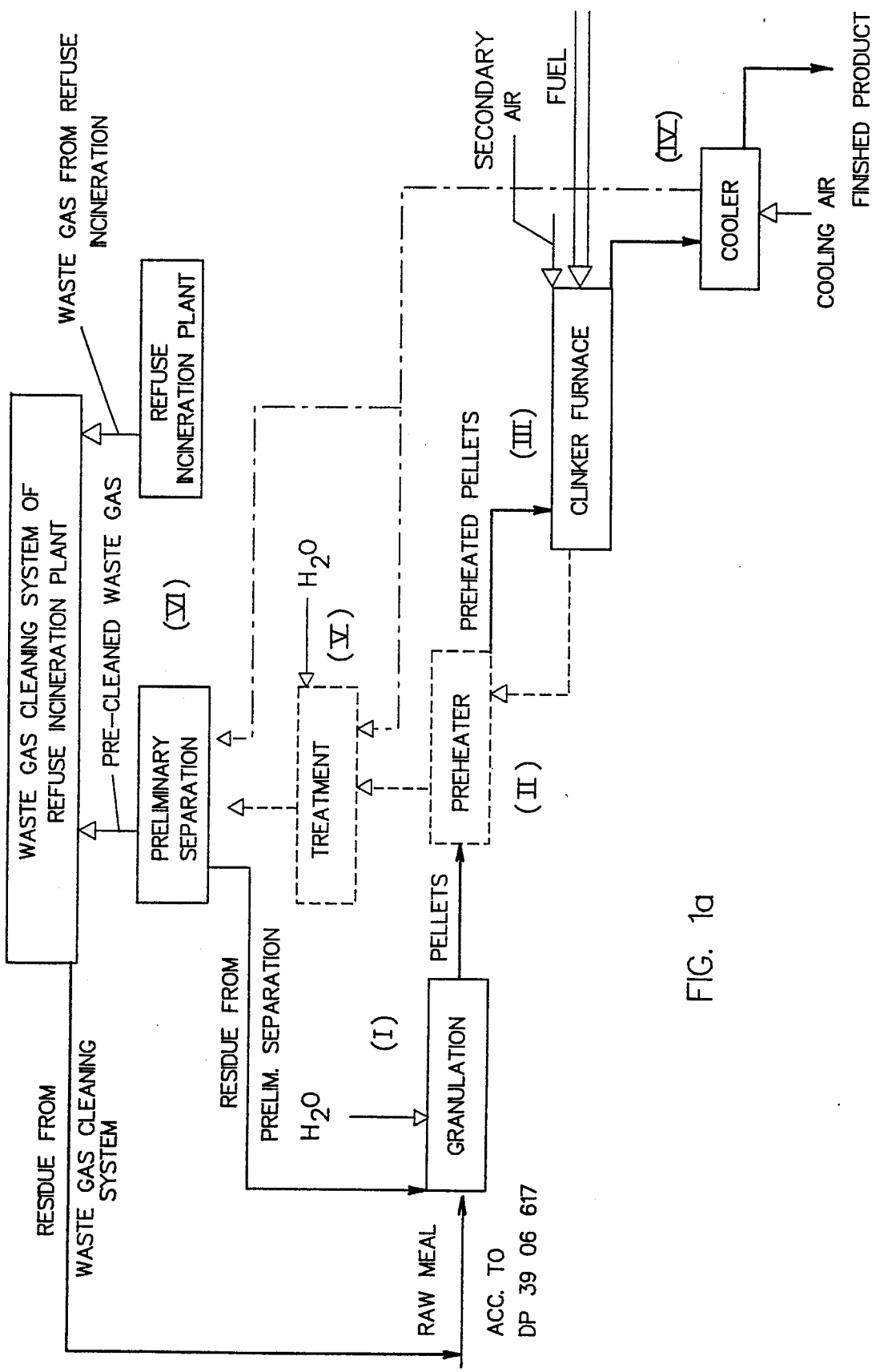
FIG. 1a is a schematic drawing illustrating the process of producing chlorosilicates from residues from waste gas cleaning apparatus.

As shown in FIG. 1a, the halogen containing residues from a waste gas cleaning system of an incineration plant, which residues, as components of a divided material or crude dust having a $CaO/SiO_2$ ratio is between 1.7 and 3.4, are first formed into pellets. The pellets are then preferably conducted to a thermal treatment process at temperatures of between 850° C. and 1250° C. in a furnace III. The furnace III can be a shaft oven, a rotary kiln, or a turbulence heater.

It has been determined that at temperatures lower than 850° C., the reaction of $SiO_2$ with chloride and CaO does not occur, while at temperatures above 1250° C., a destabilizing of the chlorosilicates occurs.

It can be advantageous, depending on the composition of the halogen containing residue from the waste gas cleaning system, to add CaO and/or $SiO_2$ containing additives to the divided material or crude dust. In this manner, the $CaCl_2$ content can be reduced and the $CaO/SiO_2$ ratio can be optimized to influence the handleability of the crude dust or raw meal and the elutriation susceptibility of the final product. Also the burning time an temperature can be favorably influenced by the raw meal composition.

As a further embodiment of the method, $Al_2O_3$ and/or sulfate containing additives can be added to the crude dust. It has been found that a sulfate concentration of more than 10% can be present without negatively influencing the binding behavior or elutriation susceptibility of the finished product.

Another embodiment of the crude dust consists of a mixture which has a $CaO/SiO_2$ relationship of greater than 2.5 and a chloride content of greater than 4.5%.

The following examples show some possible crude dust compositions for forming a finished product according to the above process:

| Example 1: | CaO | 61% |
|---|---|---|
| | $SiO_2$ | 23% |
| | $Al_2O_3$ | 4.7% |
| | MgO | 2.3% |
| | $CaCl_2$ | 7.6% |
| Example 2: | CaO | 46.9% |
| | $SiO_2$ | 16% |
| | $CaCl_2$ | 13.8% |
| | $Al_2O_3$ | 4.9% |
| | $Fe_2O_3$ | 1.8% |
| | MgO | 1.3% |
| | $K_2O$ | 1.0% |
| | $SO_3$ | 2.3% |
| | rest | 3.7% |
| | ignition loss | 8.3% |

For both examples, heating of the pellets can be done for about 2 hours at about 1050° C.

Figure 1B:
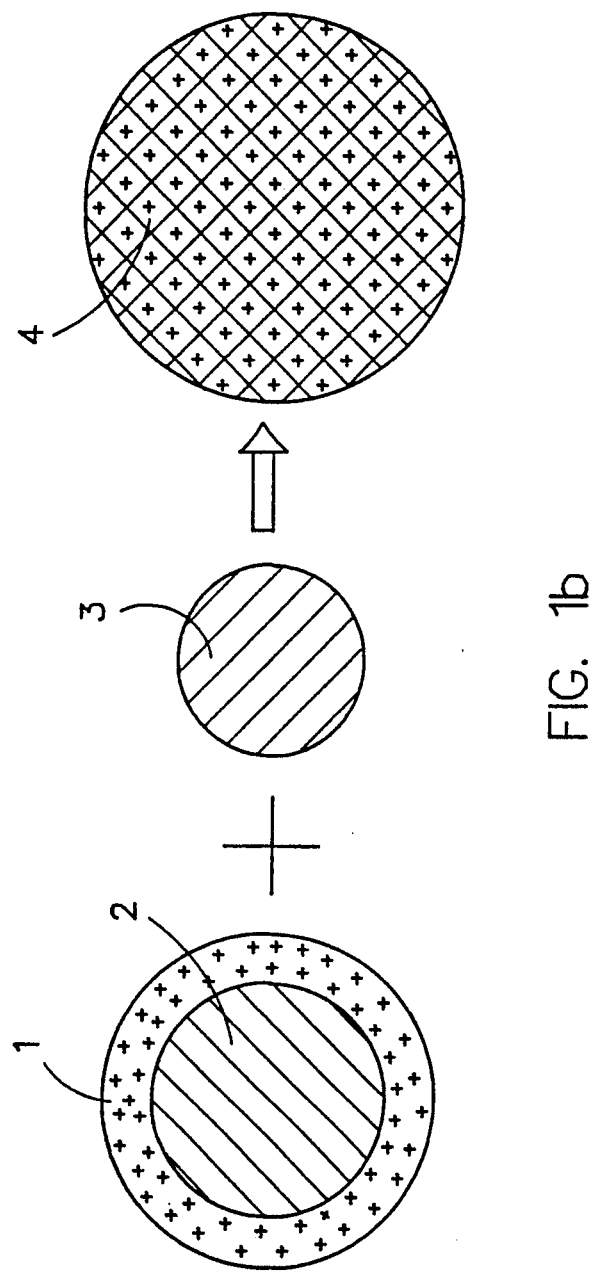
FIG. 1b is a representation of the reaction occurring during the thermal treatment process.

FIG. 1b schematically shows the reaction which occurs during the thermal treatment process. The waste gas cleaning process of an incinerator produces halogen containing residue 1, 2. The residue consists of the water soluble components 1, such as calcium chloride and heavy metals, surrounding the absorbent 2. The residue is generally a component of a crude dusts which also contains the additional components 3, CaO and $SiO_2$, or the CaO and $SiO_2$ can be added. The mixture is subjected to a thermal treatment so that the soluble components become distributed homogeneously within the formed chlorosilicate product 4.

As shown in FIG. 1, crude dust prepared according to the process as described above, is preferably granulated and formed into suitable pellets. The pellets can then be transported, if necessary, through a preheater II into a clinker furnace III. The clinker furnace III can be a revolving tubular kiln operated with a counter flow of secondary air. The pellets are generally heated in the kiln to form a product called clinker, and the clinker is then preferably removed from the clinker furnace III and passed into a cooler IV where they are cooled to a desirable temperature to provide the finished product.

The furnace I can be charged with water to aid in the granulation of the raw meal. The clinker furnace III can be charged with both fuel and secondary air, cooling air can be conducted to the cooler IV for use as the cooling medium to cool the hot clinker from the clinker furnace, and the preheater II can utilize the hot exhaust gases from the clinker furnace III as its heat source.

If necessary, a gas conditioning stage V can also be used to reduce the temperature of the waste gases formed during the thermal treatments described above. The waste gases from each of the preheater, the clinker furnace and the cooler, as indicated by the dotted and dashed lines in FIG. 1, can be directed into the gas conditioning stage, if necessary and desired. After the gas conditioning stage, the waste gases are preferably subjected to a preliminary cleaning in a preliminary precipitator VI. The pre-cleaned waste gases from the preliminary precipitator VI can then preferably be conducted to the waste gas cleaning system of the refuse incineration furnace, where the waste gas can be further cleaned to make the gas suitable for release into the atmosphere as per government regulations. Any collected residue from this incinerator cleaning step can possibly be used for producing additional chlorosilicates.

In addition, at least a portion of the residues which are formed and collected in the preliminary cleaning stage can also preferably be recycled by adding the residue back into the crude dust.

Figure 2:
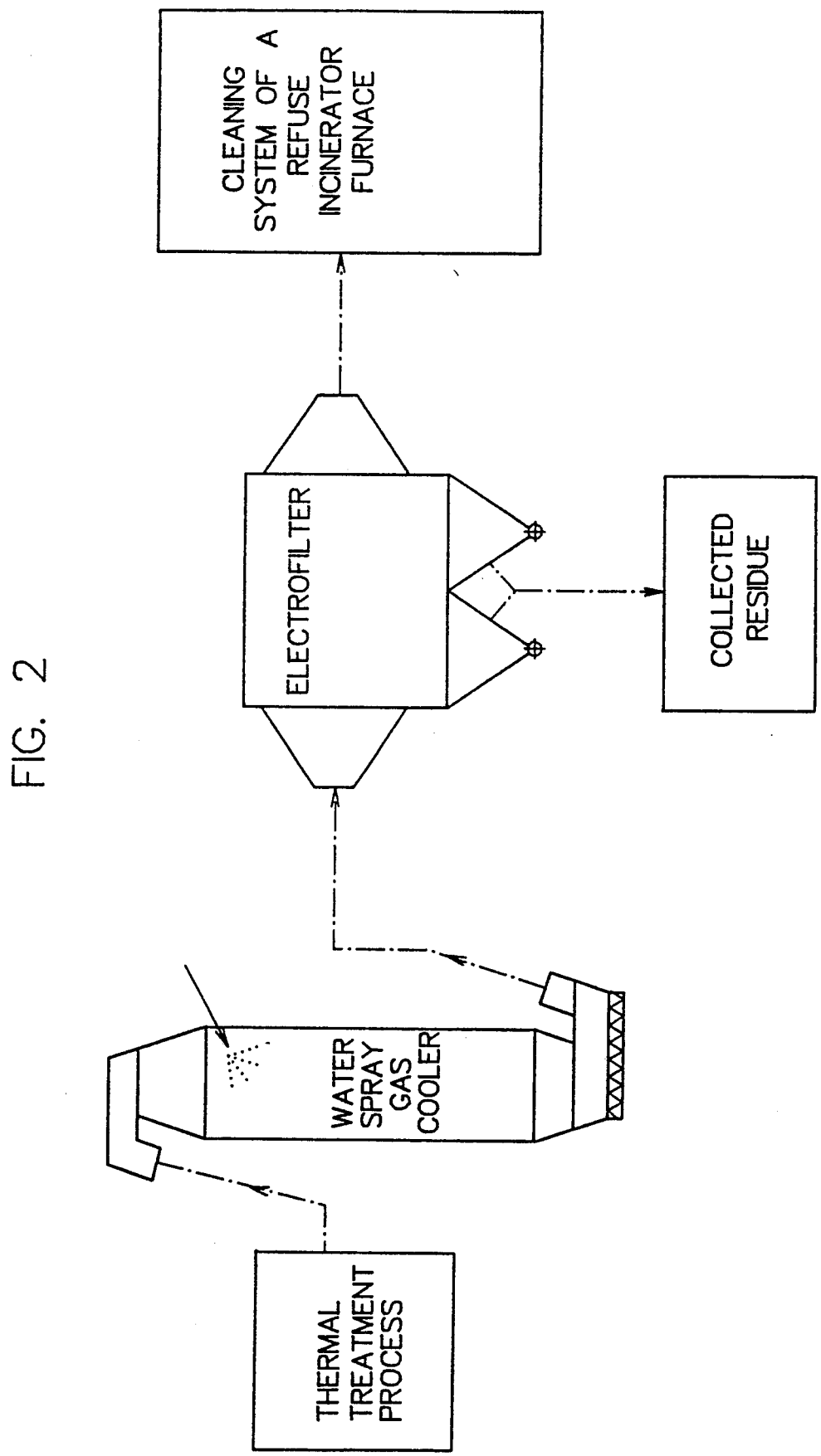
FIG. 2 is a schematic representation of one possible embodiment of the present invention.

As shown in FIG. 2, the gas conditioning stage can comprise a gas cooler which utilizes a water spray. In such a gas cooler, for example, waste gases having a temperature within a range of about 350° C. to about 400° C. can be cooled to a temperature within a range of about 100° C. to about 180° C. Such cooling is done by passing the hot waste gas into the cooler and injecting a spray of water into the cooler whereby the water lowers the temperature of the gas and, in addition, raises the dew point of the gas due to vaporization of water in the gas. This lowering of the temperature and raising of the dew point of the gas better conditions the gas for the preliminary separation step.

A dew point within a range cf about 30° C. to about 70° C., and preferable between about 45° C. to about 55° C., greatly enhances dust separation in electrofilters since the increased moisture content of the waste gas reduces the electrical resistance of the gas. As an example, the resistance of such a gas might be, before the cooling stage, about $10^{15}$·cm, while after the cooling with water, the resistance can be reduced to below about $10^{11}$·cm.

As discussed immediately above, and shown in FIG. 2, the preliminary separation step can be done using an electrofilter.

Another alternative to cooling the waste gases by spraying with water is to cool the waste gases in the presence of additional fresh air. That is, instead of injecting a spray of water into the exhaust stream, fresh air from the ambient surroundings can be injected into the exhaust stream to thereby lower the temperature.

An additional alternative to the use of an electrofilter to separate out and collect the residue is the use of mechanical filters such as web or fabric filters in the shape of tubes or bags, and ceramic filters.

In utilizing the preliminary cleaning process according to the invention, a substantial portion of the contaminants can essentially be removed from the waste gas. Thus, depending on the conditions and methods used, the amount of residue removed from the waste gases can be about 5%, about 10%, about 20%, about 30%, about 40%, about 50%, about 60%, about 70%, about 80%, about 90%, or about 99%.

Some examples of cooling waste gas with a spray of water can be found in the following U.S. Pat. Nos.: U.S. Pat. No. 4,080,910 to Pierre Jaccoud, entitled "Process for Cooling the Flue Gases in Waste Material Incineration Plants Without Heat Utilization"; U.S. Pat. No. 4,008,056 to George Potter, entitled "Scrubber System for Removing Gaseous Pollutants from a Moving Gas Stream by Condensation"; and U.S. Pat. No. 3,885,929 to Richard Lyon and Ralph Lyon, entitled "Method and Apparatus for Cleaning Exhaust Gas".

Some examples of the use of an electrofilter for the cleaning of waste gases can be found in the following U.S. Pat. Nos.: U.S. Pat. No. 4,734,105 to Eliasson et. al., entitled "Process and Device for the Removal of Solid or Liquid Particles in Suspension from a Gas Stream by Means of an Electric Field"; U.S. Pat. No. 4,678,484 to Wolfgang Hartmann and Paul Gocht, entitled "Electrofilter"; U.S. Pat. No. 4,184,886 to Karl Ellingon and Wolfgang Gaumert, entitled "Method of Conditioning Hot Gases for Filtration".

Some examples of mechanical filters for cleaning waste gases can be found in the following U.S. Pat. Nos.: U.S. Pat. No. 4,021,194 to Gustav Weislehner, entitled "Installation for the De-dusting of Hot Gases"; U.S. Pat. No. 4,886,533 to Sakashita et.al., entitled "Gas Filter"; U.S. Pat. No. 4,133,657 to Herald Krogsrud, entitled "Apparatus for Purification of Gasses"; and U.S. Pat. No. 3,966,434 to Arthur Frazier, entitled "Method for Filtering Gas and Cleaning of Filter Bags".

Some examples of gas cleaning methods utilizing sorption on calcium hydroxide can be found in the following U.S. Pat. Nos.: U.S. Pat. No. 4,501,722 to Ashley et. al., entitled "Absorption of Pollutant Type Material from a Polluted Gas"; U.S. Pat. No. 4,166,838 to Tatani et. al., entitled "Process for Treating Exhaust Gases"; and U.S. Pat. No. 3,919,392 to Aaron Joseph Teller, entitled "Abatement and Selective Recovery of Acid Gas Emissions".

An example of a gas cleaning method for a waste incineration system can be found in the following U.S. Pat. No.: U.S. Pat. No. 4,862,813 to Levin et. al., entitled "High Temperature Gas Cleaning in Municipal Solid Waste Incineration Systems".

One aspect of the invention resides broadly in a process for the production of a usable or storable product with a low susceptibility to elutriation by water. This product is produced from residues containing halides obtained from a waste gas cleaning process. The halide containing residues as components of a crude dust having a CaO/SiO$_2$ ratio between 1.7 and 3.4, are subjected to a thermal treatment for the production of chlorosilicates as disclosed by Patent 39 06 617, characterized by the fact that the waste gases formed during the thermal treatment for chlorosilicate production are subjected to a preliminary cleaning, and are then transported to the waste gas cleaning system of a refuse incineration furnace, and that the residues occurring during the preliminary cleaning are added to the crude dust or raw meal.

Another aspect of the invention is the process characterized by the fact that the waste gases are subjected to a preliminary cleaning by means of a dry sorption process, using calcium hydroxide a the basic reagent.

Yet another aspect of the invention is the process characterized by the fact that in the preliminary cleaning stage, the residues are separated from the waste gases before their entry into the waste gas cleaning system of the refuse incineration plant by mechanical filters, e.g. tube or bag filters, or by electrofilters, and are added in their entirety to the crude dust.

A further aspect of the invention is the process characterized by the fact that the waste gases, before their entry into the preliminary cleaning stage, are subjected to a gas treatment for temperature reduction.

A yet further aspect of the invention is the process characterized by the fact that the temperature reduction in the gas treatment stage is accomplished by spraying with water.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A process for the production of a chlorosilicate product from a first residue obtained from a waste gas cleaning apparatus, the first residue comprising at least chlorine, said process comprising the steps of:
    obtaining the first residue from the waste gas cleaning apparatus;
    obtaining a particulate material comprising at least CaO and $SiO_2$, the CaO and $SiO_2$ for forming said chlorosilicate product;
    mixing the first residue and the particulate material to form a first mixture;
    thermally treating said first mixture at a temperature between 850° C.–1250° C. to form at least said chlorosilicate product and exhaust gas, said exhaust gas containing a second residue; and
    separating at least a portion of the second residue from the exhaust gas sufficient to produce at least a partially purified exhaust gas.

2. The process according to claim 1, wherein the first mixture comprises CaO and $SiO_2$ in a ratio of CaO to $SiO_2$ within a range of about 1.7 to about 3.4.

3. The process according to claim 2, further including forming pellets of said first mixture prior to said thermal treatment.

4. The process according to claim 3, further including mixing the second residue with the particulate material and the first residue prior to said forming of pellets.

5. The process according to claim 4, wherein said separating comprises at least one of:
    separating said substantial portion of said second residue from said exhaust gas by sorption on an adsorbent; and
    filtering said substantial portion of said residue from said exhaust gas by filter means.

6. The process according to claim 5, wherein said adsorbent comprises $Ca(OH)_2$.

7. The process according to claim 5, wherein said filter means comprises at least one of:
    an electrofilter and a mechanical filter, and the mechanical filter further comprises at least one of
    a cloth bag filter, a cloth tube filter, and a ceramic filter.

8. The process according to claim 5, further including reducing the temperature of the exhaust gas prior to said separating.

9. The process according to claim 8, wherein said reducing of the temperature comprises at least one of:
    spraying the exhaust gas with water; and
    adding additional air to the exhaust gas.

10. The process according to claim 9, further including conducting the at least partially purified exhaust gas to said waste gas cleaning apparatus to further purify the exhaust gas.

11. The process according to claim 10, wherein the first residue comprises $CaCl_2$ and at least one of:

$CaSO_4$ and $CaF_2$.

12. The process according to claim 11, wherein the first residue additionally comprises at least one of:

$Al_2O_3$, $Fe_2O_3$, MgO, $K_2O$, and $SO_3$.

13. The process according to claim 12, wherein said thermal treatment comprises:
    preheating the first mixture in preheating apparatus; and
    heating the first mixture at said temperature of between about 850° C. to 1250° C. for about 2 hours in heating apparatus.

14. The process according to claim 13, wherein:
    said heating apparatus comprises at least one of: a shaft furnace and a rotary kiln;
    said first residue from a waste gas cleaning apparatus comprises a residue from a waste gas cleaning apparatus of a waste incinerator; and
    said chlorosilicate product is formed by heating said first mixture comprising the first residue in the presence of said particulate material comprising CaO and $SiO_2$.

* * * * *

UNITED STATES PATENT AND TRADEMARK OFFICE
CERTIFICATE OF CORRECTION

PATENT NO. : 5,229,097
DATED : July 20, 1993
INVENTOR(S) : Alfred ROEDER, Rüdiger OBERSTE-PADTBERG, Dietrich GRUSCHKA and Dieter OPITZ It is certified that error appears in the above-indentified patent and that said Letters Patent is hereby corrected as shown below:

In column 2, line 28, after 'cleaning', delete "ca" and insert --can--.

In column 6, line 63, after 'hydroxide', delete "a" and insert --as--.

In column 8, line 9, Claim 5, after the first occurrence of 'said', delete "substantial".

In column 8, line 12, Claim 5, after the first occurrence of 'said', delete "substantial".

Signed and Sealed this

Third Day of May, 1994

*Attest:*

BRUCE LEHMAN

*Attesting Officer*     *Commissioner of Patents and Trademarks*